UNITED STATES PATENT OFFICE 2,484,060

PRESSURE SENSITIVE ADHESIVE

Henry J. Wing, Milltown, N. J., assignor to Johnson & Johnson, a corporation of New Jersey No Drawing. Application June 29, 1944, Serial No. 542,829

7 Claims. (Cl. 260—23)

This invention relates to pressure-sensitive adhesive masses for use in surgical and industrial tapes.

Pressure-sensitive adhesive masses are usually made with an elastomer such as rubber, a resinous material and, in some cases, a filler and a plasticizer. The elastomer provides a pressure-sensitive cushion and the cohesive strength required in the mass so that there will be a minimum of offsetting or separation of the mass when the tape is removed from the surface to which it has been applied. The resinous material supplies adhesion or tack, whereas the filler and plasticizer serve to extend the mass and control its softness and adhesive character.

Excellent pressure-sensitive adhesive tapes have been made with masses using natural rubber as the elastomer although rubber is deficient in aging qualities and often causes irritation when applied to super-sensitive skins.

Some of the so-called rubber substitutes have properties which suggest their use as an elastomeric base in pressure-sensitive masses. Among these is polyisobutylene in the medium molecular weight range from 80,000 to 120,000. Polyisobutylene in this molecular weight range is a tough, rubber-like polymer of isobutylene. It is manufactured and sold by Standard Oil Company of New Jersey under the trade name "Vistanex Polybutene" in three grades B—80, B—100, and B—120, representing respectively the Staudinger average molecular weight readings 80,000, 100,000 and 120,000. Polyisobutylene has been successfully used as a base composition in masses for certain industrial tapes such as those having paper backings and non-fibrous film backings such as "cellophane." Such tapes have a relatively thin spread of mass whose chief quality is quick surface grab and are usually applied to clear smooth surfaces where depth of mass is not essential. A pressure-sensitive adhesive mass for a surgical tape, on the other hand, must be applied in a relatively thick layer to secure proper adhesion to the skin. So far as applicant is aware, no one prior to this invention has succeeded in making a suitable pressure-sensitive mass for a surgical tape with polyisobutylene as the sole elastomer constituent.

Heretofore it has been customary to impart the desired degree of softness or cushion to polyisobutylene masses by the use of compatible plasticizers, such as low molecular weight polyisobutylene, mineral oil, and petrolatum. Adhesive compositions plasticized in this manner, however, do not have the required firmness for heavy applications of mass to the backings (of the order of three to six ounces of mass per square yard), which are used in surgical and in industrial cloth backed tapes. Moreover, such compositions are so sticky that they cannot be compounded and calendered satisfactorily. Tapes made therewith are very difficult to unroll and show excessive transfer to the backing. These limitations of polyisobutylene are well known to those skilled in the art and have proved a barrier to the use of this material in cloth backed tapes.

According to the present invention, masses suitable for use in surgical tapes and in cloth backed industrial tapes have been prepared with polyisobutylene as the elastomer by using a factice as a constituent. The factice extends the polyisobutylene and imparts a spongy, cushion-like character to the mass. It appears to act as a dispersing agent and enables ordinary and otherwise incompatible resins and plasticizers to be used in normal amounts. The improved masses are not excessively sticky; they possess the requisite cushioning action and their aging qualities, as determined by accelerated aging tests, far surpass those of similar masses made with natural rubber as the elastomeric base. The use of factice also modifies the working properties of the mass so that it can be compounded and calendered with the mills and calenders used in producing rubber base plaster.

Different types of factices may be used. One factice having much merit is of a gel type characterized by its softness and high acetone extract value. It may be prepared by processing one hundred parts of soya-bean oil and twenty-five parts of a glyceryl ester of hydrogenated abietic acid with sulphur and under such conditions of heating as to produce an acetone extract value within a range of forty to fifty per cent. Another gel type soya-bean oil factice that may be used is produced commercially by the Stamford Rubber Supply Company and sold under the trade name "Amberex S." It is a three dimensional polymer prepared by treating soybean oil with sulfur and $H_2S$. This factice has an acetone extract value in the same range but is made without the glyceryl ester of hydrogenated abietic acid.

The dispersing action of the high acetone extract factice permits lanolin, which is incompatible with polyisobutylene, to be incorporated in the mass without harm to its aging qualities. Lanolin is desirable in an adhesive mass for surgical tapes since it has a soothing effect upon the skin. It absorbs moisture from the skin and allows it to pass through the plaster more readily. It has also been found that beeswax has a beneficial effect upon the mass in that it stabilizes the dispersion. Lanolin and beeswax also serve to soften the mass.

Many types of factice have been examined with acetone extract from about ten to fifty per cent. It has been found, however, that only the gel type of factice characterized by high acetone extract can be used in compositions containing lanolin as a plasticizer. Masses containing lanolin and made with factice of low acetone extract dry out and lose their tacky character rather quickly. This notable difference in factice is attributed to the dispersing effect of the fatty substances present in the gel type factice. When lanolin is used as a plasticizer it is preferred to use a factice with an acetone extract of about thirty per cent or higher.

However, adhesive compositions have been made in accordance with the invention with polyisobutylene and a factice having a low acetone extract value. For example, many useful compositions have been made with a rape seed oil factice having an acetone extract value of about fifteen per cent and which is produced and sold by the Stamford Rubber Supply Company as "Amberex B." This factice is a three dimensional polymer prepared by treating rape seed oil with sulfur and H₂S. With this factice, the preferred plasticizers include mineral oil, petrolatum, beeswax, and the "Vistacs," #1 and #2. Vistac #1 and #2 are viscous, tacky, and stable liquid polyisobutylenes and may be obtained from Advance Solvents and Chemical Corporation. Suitable mineral oils include white mineral oil which is a mixture of liquid hydrocarbons obtained from petroleum, and "Circo Light Process Oil" sold by Sun Oil Company. "Circo Light Process Oil" is an oil derived from petroleum and which has a high degree of naphthenicity. These plasticizers also may be used with high acetone extract factice.

With regard to tackifying agents, glyceryl ester of hydrogenated abietic acid gives best results with the gel type factice. A material of this type having an acid number less than 10 is sold by Hercules Powder Company under the trade name "Staybelite Ester #10." With low acetone extract factice, such as Amberex B, the Staybelite Ester #10 may be used or a beta pinene polymer sold by the Pennsylvania Industrial Chemical Corporation under the trade name "Piccolyte."

Piccolyte is made in a wide range of melting points but those preferred are the resins with melting points in the range of 85° C. to 115° C., known as Piccolytes S–85, S–100, and S–115. The "piccolytes" are thermoplastic, essentially neutral and unsaponifiable polymers of beta-pinene containing slight amounts of residual unsaturation. Other suitable tackifying resins include estergum, a hydrogenated abietic acid resin having a melting point approximating 160° to 180° F. such as the material sold by Hercules Powder Co., under the trade name "Staybelite A," and a hydrogenated coumarone-indene resin essentially unsaponifiable and containing low residual unsaturation, such as the material sold by the Neville Company under the trade name "Nevillite."

An excellent filling agent for these compositions is hydrated alumina which may be obtained from the Aluminum Company of America in various grades. One grade receives no special treatment whereas other grades are surface-coated with stearic acid or other fatty substances. Any grade may be used although the treated variety is employed when it is desirable to take advantage of the slight softening and modifying effect the fatty coating substances have on the character of the mass. Other filling materials include titanium dioxide, zinc oxide, calcium carbonate and starch. These filling materials serve as extending and reinforcing agents to increase the cohesive strength and firmness of the mass.

The use of antioxidants is discretionary. In general, they improve the aging characteristics of the mass and the use of a small amount is recommended. Suitable antioxidants include diamyl hydroquinone and dibutyl hydroquinone such as the relatively pure grades thereof made by Monsanto Chemical Company and sold under the trade names "Santovar A" and "Santovar O."

In the following illustrative examples the amounts indicated are in percentage by weight.

*Example I*

| | |
|---|---|
| Polyisobutylene 80,000 | 15 |
| Factice (high acetone extract) | 20 |
| Glyceryl ester of hydrogenated rosin | 25 |
| Vistac #2 | 8 |
| Lanolin | 7 |
| Beeswax | 2 |
| Starch | 19.8 |
| Titanium dioxide | 3 |
| Santovar | .2 |

*Example II*

| | |
|---|---|
| Polyisobutylene 80,000 | 17 |
| Factice (high acetone extract) | 10 |
| Glyceryl ester of hydrogenated rosin | 24 |
| Vistac #1 | 12 |
| Lanolin | 7 |
| Beeswax | 3 |
| Titanium dioxide | 5 |
| Hydrated alumina | 21.5 |
| Santovar | .5 |

*Example III*

| | |
|---|---|
| Polyisobutylene 80,000 | 20 |
| Amberex S (high acetone extract factice) | 9 |
| Glyceryl ester of hydrogenated rosin | 25 |
| Beeswax | 3 |
| Lanolin | 7 |
| Vistac #1 | 12 |
| Hydrated alumina | 18.5 |
| Titanium dioxide | 5 |
| Santovar | .5 |

*Example IV*

| | |
|---|---|
| Polyisobutylene 100,000 | 10 |
| Amberex B (low acetone extract factice) | 14 |
| Glyceryl ester of hydrogenated rosin | 20 |
| Vistac #2 | 24 |
| Zinc oxide | 26.8 |
| Titanium dioxide | 5 |
| Santovar | .2 |

*Example V*

| | |
|---|---|
| Polyisobutylene 100,000 | 15 |
| Amberex B (low acetone extract factice) | 13 |
| Beeswax | .5 |
| Vistac #1 | 25 |
| Glyceryl ester of hydrogenated rosin | 20 |
| Hydrated alumina | 21 |
| Titanium dioxide | 5 |
| Santovar | .5 |

Example VI

| | |
|---|---|
| Polyisobutylene 100,000 | 15 |
| Amberex B (low acetone extract factice) | 20 |
| Piccolyte S-100 | 10 |
| Vistac #2 | 20 |
| Zinc oxide | 30 |
| Petrolatum | 5 |

Example VII

| | |
|---|---|
| Polyisobutylene 100,000 | 15 |
| Amberex B (low acetone extract factice) | 13 |
| Vistac #1 | 15 |
| Hydrated alumina | 28 |
| Piccolyte S-100 | 15 |
| Titanium dioxide | 5 |
| White mineral oil | 8 |
| Beeswax | .5 |
| Santovar | .5 |

It has been found that the plasticity of commerical polyisobutylene in the different stated molecular weights, varies in irregular distribution as follows: 80,000 molecular weight, from about 2.6 m. m. to 3.6 m. m., with an average of about 3.2 m. m.; 100,000 molecular weight from about 2.8 m. m. to 4.0 m. m., with an average of about 3.5 m. m.; and 120,000 molecular weight from about 3.8 m. m. to 4.2 m. m., with an average of about 4.0. These plasticity values are those determined with a modified Williams plastometer and represent the thickness under compression of 2 gram cylindrical samples having a diameter of 5/8 inch when subjected to a compressional load of 5,000 grams for 14 minutes at 100° C.

In general, it may be stated that the lower the plasticity of the polyisobutylene, the softer and tackier is the mass made therefrom. Accordingly, to insure uniformity in the mass it is preferred, because of the wide variation in the plasticity of the polyisobutylene as it is obtained commercially, to blend the elastomer to an average plasticity value. For example, when it is desired to use a polyisobutylene of 80,000, 100,000, or 120,000 molecular weight, blends are used in which the plasticity has been adjusted to about 3.2 m. m., 3.5 m. m., and 4.0 m. m. respectively.

Factice has the same desirable effect when other elastomers are used with polyisobutylene. In the examples given below there has been substituted in one case rubber for a portion of the polyisobutylene and in the other case GRS (butadiene-styrene copolymer).

Example VIII

| | |
|---|---|
| Polyisobutylene 80,000 | 15 |
| Para rubber | 10 |
| Factice (high acetone extract) | 5 |
| Glyceryl ester of hydrogenated rosin | 30 |
| Lanolin | 8 |
| Titanium dioxide | 5 |
| Zinc oxide | 26.8 |
| Santovar | .2 |

Example IX

| | |
|---|---|
| Polyisobutylene 80,000 | 15 |
| GRS (butadiene-styrene copolymer) | 10 |
| Factice (high acetone extract) | 5 |
| Glyceryl ester of hydrogenated rosin | 28 |
| Lanolin | 7 |
| Beeswax | 2 |
| Zinc oxide | 32.8 |
| Santovar | .2 |

It will be understood of course that the percentages given in the foregoing examples are in no sense limiting since good adhesives may be made with other proportions. Thus, good adhesives have been made using materials within the following ranges: polyisobutylene, 10 to 25 per cent, factice, 5 to 30 per cent, tackifyer resin 10 to 35 per cent, plasticizer or plasticizer-tackifyer, 5 to 30 per cent, filler 20 to 35 per cent, and up to 3 per cent beeswax, and up to 12 per cent lanolin when the latter two materials are used. Antioxidants may be used in desired amounts, limited in the case of certain antioxidants by their irritating or staining effects.

The various formulations are mixed on a standard two roll rubber mill until all the materials are thoroughly incorporated and a homogeneous mass results. The batch is then transferred to a calendering machine for transfer to a backing which preferably is cloth but which may be any suitable porous, fibrous substitute therefor. These masses may be sterilized if desired without deteriorating from their quality.

The invention has been described by way of example only and there are many modifications thereof which are comprised within its spirit. The invention, therefore, is to be limited only by the prior art and the scope of the appended claims.

What is claimed is:

1. A normally tacky pressure-sensitive adhesive mass having a spongy, cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially in percentage range by weight, from 10 to 25 per cent polyisobutylene having a molecular weight substantially of the order of 80,000 to 120,000, 5 to 30 per cent factice as a modifier for the polyisobutylene, 10 to 35 per cent tackifying resin, 5 to 30 per cent plasticizer, and at least 20 per cent of inert reinforcing filler, the tackifying resin and the plasticizer being compatible with the polyisobutylene as modified by the factice.

2. A normally tacky pressure-sensitive adhesive mass having a spongy, cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially in percentage range by weight, from 10 to 25 per cent polyisobutylene having a molecular weight substantially of the order of 80,000 to 120,000, 5 to 30 per cent factice having an acetone extract value at least as high as 30%; as a modifier for the polyisobutylene, 10 to 35 per cent tackifying resin, 5 to 30 per cent plasticizer comprising lanolin, and 20 to 35 per cent inert reinforcing filler, the tackifying resin and the plasticizer being compatible with the polyisobutylene as modified by the factice.

3. A normally tacky pressure-sensitive adhesive mass having a spongy, cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially in percentage range by weight, from 10 to 25 per cent polyisobutylene having a molecular weight substantially of the order of 80,000 to 120,000, 5 to 30 per cent factice having an acetone extract value at least as high as 30%; as a modifier for the polyisobutylene, 10 to 35 per cent tackifying resin, 5 to 30 per cent plasticizer comprising beeswax not substantially in excess of 3% and lanolin not substantially in excess of 12%, and 20 to 35 per cent inert reinforcing filler, the tackifying resin and the plasticizer being compatible with the polyisobutylene as modified by the factice.

4. A normally tacky pressure-sensitive mass having a spongy, cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially in percentage range by weight, from 10 to 25 per cent polyisobutylene having a molecular weight substantially of the order of 80,000 to 120,000, 5 to 30 per cent factice as a modifier for the polyisobutylene, 10 to 35 per cent tackifying resin, 5 to 30 per cent plasticizer comprising lanolin, and 20 to 35 per cent inert filler, the factice having an acetone extract value at least as high as 30 per cent and the tackifying resin and the plasticizer being compatible with the polyisobutylene as modified by the factice.

5. A normally tacky pressure-sensitive adhesive mass having a spongy, cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially, in percentage range by weight, from 10 to 25 per cent of an elastomeric cohesive ingredient consisting of a major portion of polyisobutylene having a molecular weight substantially of the order of 80,000 to 120,000 and a material selected from the group consisting of rubbery butadiene styrene copolymer and rubber, 5 to 30 per cent factice as a modifier for the elastomeric cohesive ingredient, 10 to 35 per cent tackifying resin, 5 to 30 per cent plasticizer, and at least 20 per cent inert reinforcing filler, the tackifying resin and the plasticizer being compatible with the elastomeric cohesive ingredient as modified by the factice.

6. A normally tacky pressure-sensitive adhesive mass having a spongy, cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially in percentage range by weight from 10 to 25 per cent polyisobutylene having a molecular weight substantially of the order of 80,000 to 120,000, 5 to 30 per cent factice as a modifier for the polyisobutylene, 10 to 35 per cent tackifying resin comprising predominantly beta pinene polymer having a melting point within the range 85° to 115° C., 5 to 30 per cent plasticizer comprising predominantly a viscous liquid polyisobutylene, and at least 20 per cent reinforcing filler comprising predominantly hydrated alumina, the tackifying resin and the plasticizer being compatible with the polyisobutylene as modified by the factice.

7. A normally tacky pressure-sensitive adhesive mass having a spongy cushion-like character adapted for coating on a porous, fibrous tape backing in a layer sufficiently thick to secure proper adhesion to human skin, and possessing such internal cohesive strength as to enable a tape surfaced therewith to be unwound from a roll without substantial offsetting, said adhesive mass comprising substantially in percentage range by weight from 10 to 25 per cent polyisobutylene, having a molecular weight substantially of the order of 80,000 to 120,000, 5 to 30 per cent factice as a modifier for the polyisobutylene, 10 to 35 per cent tackifying resin comprising predominantly beta-pinene polymer having a melting point within the range 85 to 115° C., 5 to 30 per cent plasticizer comprising predominantly a viscous liquid polyisobutylene and 20 to 35 per cent inert reinforcing filler comprising predominantly hydrated alumina, the tackifying resin and the plasticizer being compatible with the polyisobutylene as modified by the factice.

HENRY J. WING.

REFERENCES CITED

The following references are of record in the file of this patent:

UNITED STATES PATENTS

| Number | Name | Date |
|---|---|---|
| 2,090,708 | Stahl | Aug. 24, 1937 |
| 2,124,235 | Mueller-Cunradi et al. | July 19, 1938 |
| 2,235,536 | Savage et al. | Mar. 18, 1941 |
| 2,243,386 | Lewis et al. | May 27, 1941 |
| 2,319,959 | Tierney | May 25, 1943 |
| 2,353,462 | Harkins | July 11, 1944 |